US011228521B2

(12) United States Patent
Mullis (10) Patent No.: US 11,228,521 B2
(45) Date of Patent: Jan. 18, 2022

(54) SYSTEMS AND METHOD FOR DETECTING FAILOVER CAPABILITY OF A NETWORK DEVICE

(71) Applicant: Schweitzer Engineering Laboratories, Inc., Pullman, WA (US)

(72) Inventor: Tristan Lloyd Mullis, Pullman, WA (US)

(73) Assignee: Schweitzer Engineering Laboratories, Inc., Pullman, WA (US)

(*) Notice: Subject to any disclaimer, the term of this patent is extended or adjusted under 35 U.S.C. 154(b) by 192 days.

(21) Appl. No.: 16/672,630

(22) Filed: Nov. 4, 2019

(65) Prior Publication Data

US 2021/0135972 A1 May 6, 2021

(51) Int. Cl.
*H04W 4/00* (2018.01)
*H04L 12/26* (2006.01)

(52) U.S. Cl.
CPC .......... *H04L 43/50* (2013.01); *H04L 43/0894* (2013.01)

(58) Field of Classification Search
CPC ..... H04L 43/50; H04L 43/0894; H04L 41/04; H04L 41/0672; H04L 12/2697; H04Q 11/00–478
USPC ........................................................ 370/250
See application file for complete search history.

(56) References Cited

U.S. PATENT DOCUMENTS

| | | | |
|---|---|---|---|
| 6,747,957 B1 | 6/2004 | Pithawala | |
| 7,218,632 B1 | 5/2007 | Bechtolsheim | |
| 7,376,831 B2 | 5/2008 | Kollmyer | |
| 7,872,983 B2 | 1/2011 | Lai | |
| 8,553,544 B2 | 10/2013 | Lai | |
| 8,800,044 B2 | 8/2014 | Raad | |
| 9,038,151 B1 | 5/2015 | Chua | |
| 9,237,129 B2 | 1/2016 | Ling | |
| 9,286,171 B2 | 3/2016 | Cardona | |
| 9,432,255 B1 | 8/2016 | Hasan | |
| 9,432,380 B2 | 8/2016 | Margalit | |
| 9,680,588 B2 | 6/2017 | Connolly | |
| 9,686,125 B2 | 6/2017 | Smith | |
| 9,769,060 B2 | 9/2017 | Dearien | |

(Continued)

FOREIGN PATENT DOCUMENTS

| | | |
|---|---|---|
| EP | 2765751 | 8/2014 |
| KR | 20150051107 | 5/2015 |
| WO | 2015038040 | 3/2015 |

OTHER PUBLICATIONS

Braun, Wolfgang, Menth, Michael, Software-Defined Networking Using OpenFlow: Protocols, Applications and Architectural Design Choices, Future Internet, May 12, 2014.

(Continued)

*Primary Examiner* — Chuong T Ho
(74) *Attorney, Agent, or Firm* — Stoel Rives LLP (57) ABSTRACT

Systems and methods for detecting a failover capability of a network device of a computer network are disclosed. A network controller, upon detecting incoming traffic from a network device, can disable the port of the network where the incoming traffic is detected. The network controller can then detect if the network device has failed over to send network traffic to the network via another port of the network, or determine the network device is incapable of failover communication if network traffic from the network device only arrives at the original port after that port is re-enabled.

18 Claims, 4 Drawing Sheets

(56) References Cited

U.S. PATENT DOCUMENTS

| | | | |
|---|---|---|---|
| 2002/0172157 A1 | 11/2002 | Rhodes | |
| 2003/0112821 A1 | 6/2003 | Cleveland | |
| 2003/0125924 A1 | 7/2003 | Lines | |
| 2003/0133443 A1 | 7/2003 | Klinker | |
| 2003/0188159 A1 | 10/2003 | Josset | |
| 2005/0025141 A1 | 2/2005 | Chao | |
| 2005/0078672 A1 | 4/2005 | Caliskan | |
| 2005/0192008 A1 | 9/2005 | Desai | |
| 2007/0133395 A1* | 6/2007 | Herring | H04Q 3/0079 370/216 |
| 2008/0005558 A1 | 1/2008 | Hadley | |
| 2008/0080384 A1 | 4/2008 | Atkins | |
| 2009/0257743 A1 | 10/2009 | Chung | |
| 2009/0285093 A1 | 11/2009 | Bolt | |
| 2009/0313189 A1 | 12/2009 | Sun | |
| 2010/0241608 A1 | 9/2010 | Huang | |
| 2011/0085567 A1 | 4/2011 | Beecroft | |
| 2011/0087952 A1 | 4/2011 | Marin | |
| 2013/0077477 A1 | 3/2013 | Daraiseh | |
| 2013/0108259 A1 | 5/2013 | Srinivas | |
| 2013/0159865 A1 | 6/2013 | Smith | |
| 2013/0212285 A1 | 8/2013 | Hoffmann | |
| 2013/0250770 A1 | 9/2013 | Zou | |
| 2013/0263247 A1 | 10/2013 | Jungck | |
| 2013/0294228 A1 | 11/2013 | Ahuja | |
| 2013/0339955 A1* | 12/2013 | Prawer | G06F 9/45533 718/1 |
| 2014/0025945 A1 | 1/2014 | McGrew | |
| 2014/0029451 A1 | 1/2014 | Nguyen | |
| 2014/0064100 A1 | 3/2014 | Edwards et al. | |
| 2014/0112130 A1 | 4/2014 | Yang et al. | |
| 2014/0115706 A1 | 4/2014 | Silva et al. | |
| 2014/0129700 A1 | 5/2014 | Mehta | |
| 2014/0153572 A1 | 6/2014 | Hampel | |
| 2014/0160939 A1 | 6/2014 | Arad | |
| 2014/0226467 A1 | 8/2014 | Park | |
| 2014/0241345 A1 | 8/2014 | DeCusatis | |
| 2014/0245387 A1 | 8/2014 | Colpo | |
| 2014/0280834 A1 | 9/2014 | Medved | |
| 2014/0325038 A1 | 10/2014 | Kis | |
| 2014/0325649 A1 | 10/2014 | Zhang | |
| 2014/0371941 A1 | 12/2014 | Keller et al. | |
| 2014/0376406 A1 | 12/2014 | Kim | |
| 2015/0081762 A1 | 3/2015 | Mason et al. | |
| 2015/0112933 A1 | 4/2015 | Satapathy | |
| 2015/0172222 A1* | 6/2015 | Liao | H04L 49/351 370/392 |
| 2015/0195190 A1 | 7/2015 | Shah Heydari | |
| 2015/0312658 A1 | 10/2015 | Winzer | |
| 2015/0363522 A1 | 12/2015 | Maurya | |
| 2016/0043996 A1 | 2/2016 | Syed Mohamed | |
| 2016/0119299 A1 | 4/2016 | Amulothu | |
| 2016/0142427 A1 | 5/2016 | de los Reyes | |
| 2016/0165454 A1 | 6/2016 | Li | |
| 2016/0330076 A1 | 11/2016 | Tiwari | |
| 2016/0337247 A1 | 11/2016 | Yao | |
| 2016/0344592 A1 | 11/2016 | Cook | |
| 2017/0026225 A1 | 1/2017 | Smith | |
| 2017/0026226 A1 | 1/2017 | Grussling | |
| 2017/0026243 A1 | 1/2017 | Berner | |
| 2017/0026252 A1 | 1/2017 | Dearien | |
| 2017/0026276 A1 | 1/2017 | Dearien | |
| 2017/0026291 A1 | 1/2017 | Smith | |
| 2017/0026292 A1 | 1/2017 | Smith | |
| 2017/0026349 A1 | 1/2017 | Smith | |
| 2017/0118066 A1* | 4/2017 | Mathew | H04L 41/20 |
| 2019/0334808 A1* | 10/2019 | Nandy | H04L 43/0811 |

OTHER PUBLICATIONS

Cahn, Adam, Hoyos, Juan, Hulse, Matthew, Keller, Eric, Software-Defined Energy Communication Networks: From Substation Automation to Future Smart Grids, Smart Grid Communications, IEEE Oct. 2013.

Dally, William J., Virtual-Channel Flow Control, IEEE Transactions on Parallel and Distributed Systems, vol. 3, No. 2, Mar. 1992.

Jain, Sushant, et al., B4: Experience with a Globally-Deployed Software Defined WAN, ACM SIGCOMM Computer Communication Review, vol. 43 Issue 4, pp. 3-14. Oct. 2013.

Monaco, Matthew, Michel, Oliver, Keller, Eric, Applying Operating System Principles to SDN Controller Design, Hotnets '13, Nov. 2013.

Drutskoy, Dmitry, Keller, Eric, Rexford, Jennifer, Scalable Network Virtualization in Software-Defined Networks, IEEE Internet Computing, vol. 17, Issue: 2, Nov. 27, 2012.

Kuzniar, Maciej, et al., Automatic Failure Recovery for Software-Defined Networks, HotSDN '13 , Aug. 16, 2013.

Mizrahi, Tai, Moses, Yoram. ReversePTP: A Software Defined Networking Approach to Clock Synchronization, HotSDN '14, Aug. 22, 2014.

Ramos, Ramon Marques, et al. SlickFlow: Resilient Source Routing in Data Centere Networks Unlocked by OpenFlow, 2013 IEEE 38th Conference on Local Computer Networks, Oct. 2013.

Torhonen, Ville, Designing a Software-Defined Datacenter, Master of Science Thesis, Tampere University of Technology, May 2014.

Yang, Qiaoyin and Smith, Rhett, Improve Protection Communications Network Reliability Through Software-Defined Process Bus, Jan. 2018.

Dearien, Jason: "Setting Up a Fully Redundant RSTP-to-SDN Tie Point" Application Guide, vol. II AG2017-28, Sep. 22, 2017.

* cited by examiner

SYSTEMS AND METHOD FOR DETECTING FAILOVER CAPABILITY OF A NETWORK DEVICE

TECHNICAL FIELD

This disclosure relates to systems and methods of a control or monitoring network for an electric power delivery system, and more particularly to systems and methods for detecting a failover capability of a network device of such network.

DETAILED DESCRIPTION OF PREFERRED EMBODIMENTS

A modern electric power system (sometimes herein "power system") may incorporate a variety of control, monitoring, and/or communication technologies and devices that may be used to control, monitor, automate, and communicate information, for example, to protect the power system.

Communication equipment coupled to and/or integrated with the devices may be configured to form one or more communication networks that can be utilized to facilitate an exchange of data among a variety of devices that monitor conditions and/or control actions on the power system to maintain the stability of the power system. The communication network(s) can send messages that carry information for a proper assessment of power system conditions and for implementing control actions based on such conditions. The potential for rapid changes in conditions of a power system results in constraints on the messages sent by a communication network (e.g., time constraints).

In some embodiments, the communication network(s) may include software defined network ("SDN") technologies that may include a controller that regulates communications on the network. SDN technologies offer a variety of features that can be advantageous for use with power systems (e.g., deny-by-default security, latency guarantees, deterministic transport capabilities, network agility, redundancy and fail over planning, etc.).

The embodiments of the disclosure will be best understood by reference to the drawings, wherein like parts are designated by like numerals throughout. It will be readily understood that the components of the disclosed embodiments, as generally described and illustrated in the figures herein, could be arranged and designed in a wide variety of different configurations. Thus, the detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

In some cases, well-known features, structures or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations. In addition, the terms "comprising" and "including" are open ended and even may allow for the inclusion of elements similar to recited elements but having different characteristics and/or configurations.

Electric power generation and delivery systems are designed to generate, transmit, and distribute electrical energy to loads. Electric power generation and delivery systems may include equipment such as: electrical generators, electrical motors, power transformers, power transmission and distribution lines, circuit breakers, switches, busses, voltage regulators, capacitor banks, and the like. Such equipment may be monitored, controlled, automated, and/or protected using one or more intelligent electronic devices (IEDs) that may receive electric power delivery system information from the equipment, make decisions based on the information, and provide monitoring, control, protection, and/or automation outputs to the equipment In some embodiments, an IED may include, for example, remote terminal units, differential relays, distance relays, directional relays, feeder relays, overcurrent relays, voltage regulator controls, voltage relays, breaker failure relays, generator relays, motor relays, bay controllers, meters, recloser controls, governors, exciters, statcom controllers, static VAR compensator (SVC) controllers, on-load tap changer (OLTC) controllers, and the like. Further, in some embodiments, IEDs may be communicatively connected via a data transmission network that includes, for example, multiplexers, routers, hubs, gateways, firewalls, and/or switches to facilitate communications on the network. Networking and communication devices may also be integrated into an IED and/or be in communication with an IED. As used herein, the term IED may refer to a single discrete IED or to a system of multiple IEDs operating together.

Figure 1:
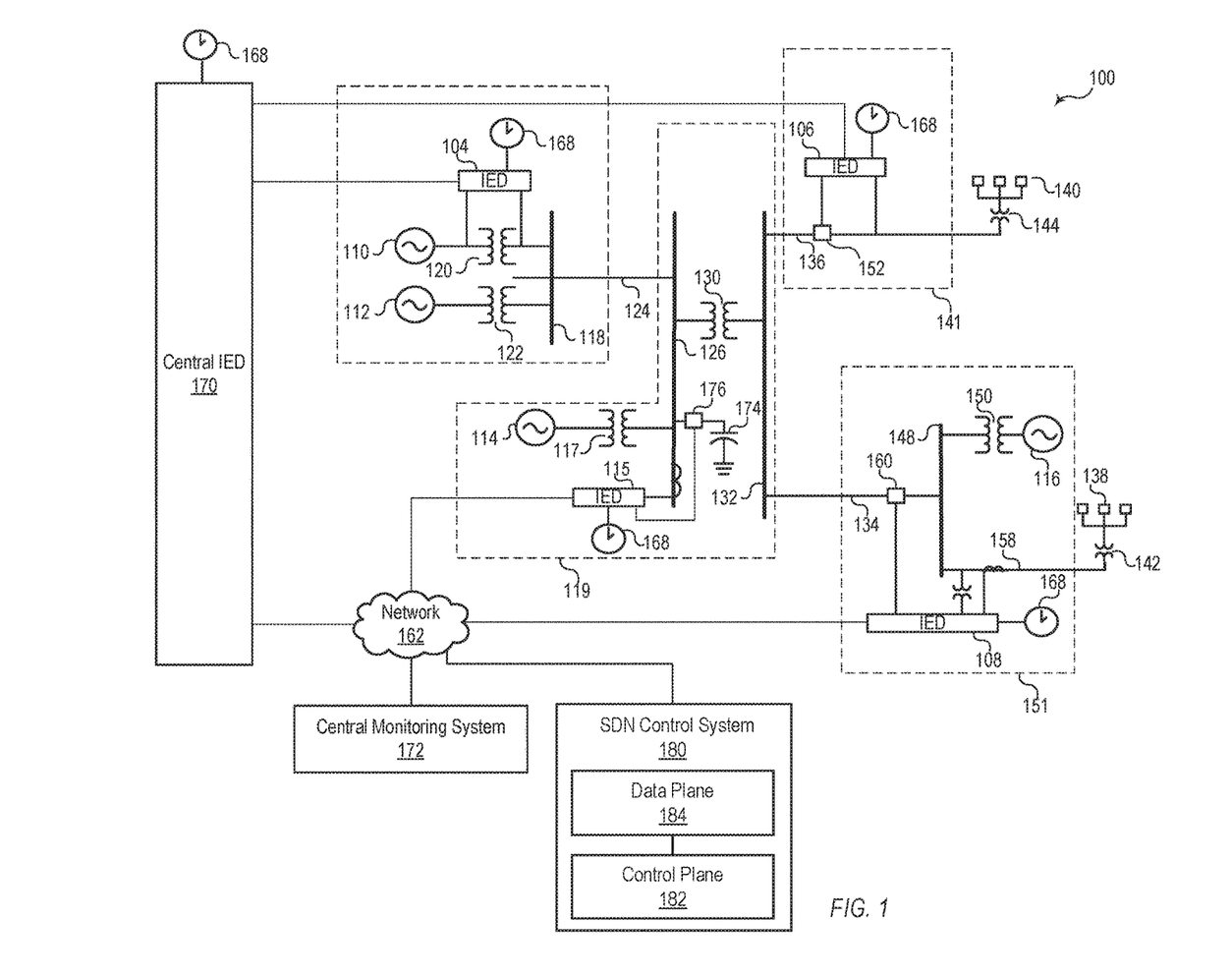
FIG. 1 illustrates an embodiment of a simplified one-line diagram of an electric power transmission and distribution system in which a plurality of communication devices facilitate communication in a software-defined network (SDN), according to one embodiment of the present disclosure.

FIG. 1 illustrates an embodiment of a simplified one-line diagram of an electric power transmission and distribution system 100 in which a plurality of communication devices facilitate communication in a software-defined network (SDN) consistent with embodiments of the present disclosure. The electric power delivery system 100 may be configured to generate, transmit, and distribute electric energy to loads. Electric power delivery systems may include equipment, such as electric generators (e.g., generators 110, 112, 114, and 116), power transformers (e.g., transformers 117, 120, 122, 130, 142, 144, and 150), power transmission and delivery lines (e.g., lines 124, 134, and 158), circuit breakers (e.g., breakers 152, 160, and 176), busses (e.g., busses 118, 126, 132, and 148), loads (e.g., loads 140 and 138) and the like. A variety of other types of equipment may also be included in the electric power delivery system 100, such as voltage regulators, capacitor banks, and a variety of other types of equipment.

A substation 119 may include a generator 114, which may be a distributed generator, and which may be connected to the bus 126 through a step-up transformer 117. The bus 126 may be connected to a distribution bus 132 via a step-down transformer 130. Various distribution lines 136 and 134 may be connected to the distribution bus 132. The distribution line 136 may lead to a substation 141 and the line may be monitored and/or controlled using an IED 106, which may selectively open and close a breaker 152. A load 140 may be fed from the distribution line 136. A step-down transformer 144 in communication with the distribution bus 132 via the distribution line 136 may be used to step down a voltage for consumption by the load 140.

The distribution line 134 may lead to a substation 151 and deliver electric power to the bus 148. The bus 148 may also receive electric power from the distributed generator 116 via a transformer 150. The distribution line 158 may deliver electric power from the bus 148 to the load 138 and may include another step-down transformer 142. The circuit breaker 160 may be used to selectively connect the bus 148 to the distribution line 134. The IED 108 may be used to monitor and/or control the circuit breaker 160 as well as the distribution line 158.

The electric power delivery system 100 may be monitored, controlled, automated, and/or protected using intelligent electronic devices (IEDs), such as IEDs 104, 106, 108, 115, and 170, and a central monitoring system 172. In general, IEDs in an electric power generation and transmission system may be used for protection, control, automation, and/or monitoring of equipment in the system. For example, IEDs may be used to monitor equipment of many types, including electric transmission lines, electric distribution lines, current transformers, busses, switches, circuit breakers, reclosers, transformers, autotransformers, tap changers, voltage regulators, capacitor banks, generators, motors, pumps, compressors, valves, and a variety of other types of monitored equipment.

As used herein, an IED (such as IEDs 104, 106, 108, 115, and 170) may refer to any microprocessor-based device that monitors, controls, automates, and/or protects monitored equipment within system 100. Such devices may include, for example, remote terminal units, differential relays, distance relays, directional relays, feeder relays, overcurrent relays, voltage regulator controls, voltage relays, breaker failure relays, generator relays, motor relays, automation controllers, bay controllers, meters, recloser controls, communications processors, computing platforms, programmable logic controllers (PLCs), programmable automation controllers, input and output modules, and the like. The term IED may be used to describe an individual IED or a system comprising multiple IEDs.

A common time signal 168 may be distributed throughout system 100. Utilizing a common or universal time source may ensure that IEDs have a synchronized time signal that can be used to generate time synchronized data, such as synchrophasors. In various embodiments, IEDs 104, 106, 108, 115, and 170 may receive a common time signal 168. The common time signal 168 may be distributed in system 100 using a communications network 162 or using a common time source, such as a Global Navigation Satellite System (GNSS), or the like. The common time signal 168 may be distributed using, for example, PTP or NTP protocols.

According to various embodiments, the central monitoring system 172 may comprise one or more of a variety of types of systems. For example, central monitoring system 172 may include a supervisory control and data acquisition (SCADA) system and/or a wide area control and situational awareness (WACSA) system. A central IED 170 may be in communication with IEDs 104, 106, 108, and 115. IEDs 104, 106, 108 and 115 may be remote from the central IED 170 and may communicate over various media such as a direct communication from IED 106 or over a wide-area communications network 162, such as via a virtual private network (VPN). According to various embodiments, certain IEDs may be in direct communication with other IEDs (e.g., IED 104 is in direct communication with central IED 170) or may be in communication via a communication network 162 (e.g., IED 108 is in communication with central IED 170 via communication network 162).

Communication via the network 162 may be facilitated by networking devices 169. One or more of the networking devices 169 may receive the common time signal 168. Examples of networking devices 169 include, but are not limited to, multiplexers, routers, hubs, gateways, firewalls, and switches. In some embodiments, IEDs and networking devices may comprise physically distinct devices. In other embodiments, IEDs and networking devices may be composite devices or may be configured in a variety of ways to perform overlapping functions. IEDs and networking devices may comprise multi-function hardware (e.g., processors, computer-readable storage media, communications interfaces, etc.) that can be utilized to perform a variety of tasks that pertain to network communications and/or the operation of equipment within system 100. Thus, the terms networking device and IED may be used interchangeably in some instances to the extent that the IED is interacting with a network (e.g., an SDN) and/or to the extent that a networking device is performing a function of an IED as described herein.

An SDN controller 180 may be configured to interface with one or more of the networking devices 169. The SDN control system 180 may facilitate the creation of an SDN within the network 162 that facilitates communication between various devices, including IEDs 170, 115, 108, and monitoring system 172. In various embodiments, the SDN control system 180 comprises a control plane 182 and a data plane 184. An operator may use the SDN control system 180 to define (e.g., program) network operation profiles of one or more networking devices and/or IEDs connected to the network 162. One or more of the network operation profiles may be configured for implementation during a time window. The common time input 168 may provide a precise time input to the networking devices 169. The networking devices 169 may use the precise time to implement the one or more time-based network operation profiles during a precise time window.

The networking devices 169 may further use the precise time from the common time input 168 to implement time-based functions within the network operation profile. For example, a network operations profile implemented by one of the networking devices 169 may define an expected baseline communication between IED 115 and central IED 170. The networking device may determine that the precise timing of communications between IED 115 and central IED 170 deviates from an expected timing of communication as set forth in the network operations profile. The network operations profile may set forth the response or behavior of the networking device in the event of such a deviation. For example, the networking device may be configured to forward the deviate communications to the central IED 170 and raise an alert. Alternatively, the network operations profile may instruct the networking device to drop deviant packets or forward deviant packets to an intrusion detection system in addition to or instead of central IED 170.

The network 162 may be a high demand/high availability network. In other words, the network 162 may comprise thousands of network devices, such as IEDs 104-108, 115, 170, etc. A number of measures may be undertaken to facilitate the high demand on the network 162. These measures may include implementation of communication protocols that, e.g., reduce the size of each message communicated across the network, reduce the volume of duplicative messaging across the network, etc.

Figure 2:
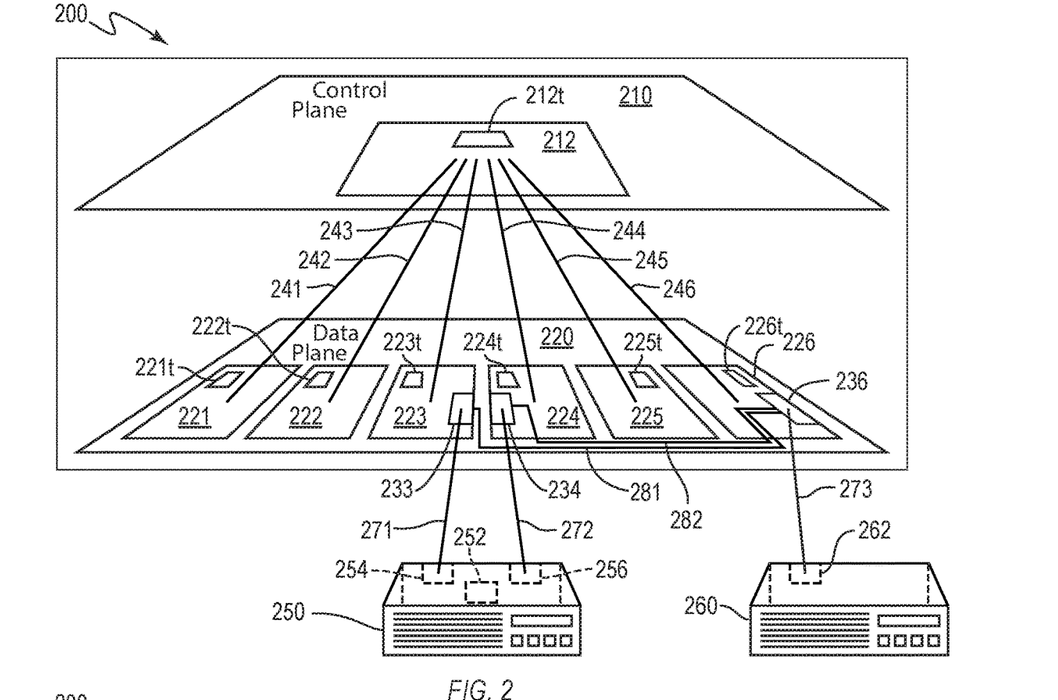
FIG. 2 is a line drawing of a portion of an SDN communication network according to one embodiment.

FIG. 2 is a line drawing of a portion of an SDN communication network 200 (also referred to herein simply as "network 200"). The network 200 may in some ways be analogous to the communication network 162 of FIG. 1. The portion of the network 200 illustrated is an SDN network. The network 200 comprises a control plane 210 and a data plane 220 (e.g., respectively analogous to the control plane 182 and data plane 184 of FIG. 1). The control plane 210 comprises an SDN controller 212 that is in electronic communication with a plurality of SDN switches 221-226 via connections 241, 242, 243, 244, 245, 246. The network controller 212 further comprises a central rules table 212t (e.g., a database) comprising rules (e.g., message (or traffic) handling instructions) for each device associated with the network 200. The data plane 220 comprises a plurality of SDN switches, which may number in the thousands. The illustrated SDN switches 221-226 may be members of the plurality of SDN switches of the data plane 220. In FIG. 2, the plurality of SDN switches may include a first SDN switch 221, a second SDN switch 222, a third SDN switch 223, a fourth SDN switch 224, a fifth SDN switch 225, and a last SDN switch 226.

Each SDN switch 221-226 comprises a local rules table 221t-226t (e.g., a database) comprising message (or traffic) handling rules for messages associated to devices known to the particular SDN switch 221-226. The local rules table 221t-226t for each respective SDN switch 221-226 may be populated with rules held at the central rules table 212t. Each particular rule may be associated with message traffic of each particular communication port of each particular SDN switch 221-226. In other words, a local rules table 223t of the third SDN switch 223 may be populated by the network controller 212 with rules from the central rules table 212t for messages particularly associated to each communication port of the third SDN switch 223. The same method of local rules table population is true for each local rules table at each SDN switch 221-226 such that each local rules table comprises rules for messages received at ports of the particular SDN switch 221-226, and each local rules table may be devoid of rules associated to messages received at the other SDN switches 221-226.

A first network device 250 and a second network device 260 are shown in FIG. 2. Some network devices have one communication port connected to the network 200, and some network devices have a plurality of communication ports connected to the network 200. The first network device 250 is connected to the network 200 via two communication ports 254 and 256 using, respectively, connections 271 and 272. The second network device 260 is connected to the network via a communications port 262 using a connection 273. In the example of FIG. 2, the first network device 250 may be generating data (such as, e.g., monitor data, control data, control-response data, etc.) intended for delivery to at least the second network device 260.

By way of example and not limitation, a first network route 281 illustrates that traffic (messages) arriving from the first network device 250 at the communication port 233 is directed to a communication port 236 of the last SDN switch 266 for delivery to the second network device 260. A second network route 282 illustrates an alternative path whereby traffic from the first network device 250 arriving at the communication port 234 may be routed to the communication port 236 of the last SDN switch 226 for delivery to the second network device 260. As described in the disclosure, only one of the communication ports 233 or 234 may be active at any given time. Likewise, only that network route 281, 282 connected to the active communication port 233, 234 may be active at any given time. The illustrated network routes 281, 282 are representative of any appropriate combination of physical and/or logical connections, pathways, and devices within the SDN network 200. Furthermore, although the network routes 281, 282 are illustrated as wholly distinct from each other, in one embodiment, one or more portions of the first network route 281 may be coexistent with one or more portions of the second network route 282.

Each network device connected to the network 200 comprises a media access controller (MAC). Each MAC has a theoretically unique MAC address. The first network device 250 comprises a MAC 252.

The data plane 220 may comprise dozens, hundreds, or even thousands of SDN switches, including at least the SDN switches 221-226. Each SDN switch may be configured to communicate with one or more network devices, and the number of network devices communicating with any given SDN switch may be in the thousands. Thus, the traffic level for the network 200 may be vast. One method of reducing the volume of traffic on the network to avoid network congestion and ensure both speed and agility is to limit the size of each message. For example, each message may comprise a header and payload. The header may comprise as little as only a MAC address for the originating network device. The payload may be limited to containing only formatted data without intervening identifiers (data-only payload).

An example of a data-only payload may be found in a message from a gas flow meter reporting a current flow rate, a maximum flow rate over a previous period of time, a minimum flow rate over the period of time, and a percentage of a target gas in the flow. With embedded flags to identify each datum, the payload may resemble: Fc0098:Fmax0102: Fmin0094:Mix085. As a data-only payload, this may appear as an integer, e.g., 009801020094085. The former example is 31 characters in length, while the latter is but 15 characters—less than half the length of the former message format. When considered across a network such as the network 200, reducing message payload size by 50% can contribute significantly to network speed and agility.

When the first network device 250 is initially connected to the network 200, the first network device 250 may attempt to negotiate communication with the network via either (but not both simultaneously) a first communication port 254 or a second communication port 256. For this example, the first network device 250 successfully establishes communication with the network 200 via the first communication port 254 and the connection 271 to a communication port 233 of the third SDN switch 223. The first network device 250 may internally designate the first communication port 254 as active and the second communication port 256 as inactive.

Once communication is established, the first network device 250 transmits a first data message, comprising a header and payload. In one embodiment, the header may comprise only the MAC address for the MAC 252. The payload may, in one embodiment, be a data-only payload.

When the third SDN switch 223 receives the first payload, the third SDN switch 223 will query the local rules table 223t. Because this is the first message the third SDN switch 223 has received from the first network device 250, it is also the first message from the MAC address for the MAC 252 to be received at the communication port 233 of the third SDN switch 223. The local rules table 223t will, therefore, not have a rule for this first message. The third SDN switch 223 may then communicate the MAC address for the MAC 252 and an identifier for the communication port 233 of the third SDN switch 223 to the network controller 212 via the connection 243. The network controller 212 may then query the central rules table 212t.

In one embodiment, if the MAC address for the MAC 252 is expected to be connected to the network 200, the MAC address will be in the central rules table 212t. In the present example, the particular message is the first message from the first network device 250, hence, the first message bearing the MAC address for MAC 252, to be communicated to the network 200. Accordingly, the MAC address should be found in the central rules table 212t, but has no SDN switch or SDN switch-communication port associated. The network controller 212 may update the central rules table 212t to reflect that the MAC address for the MAC 252 of the first network device 250 is communicating with the network 200 via the port 233 of the third SDN switch 223. The network controller 212 can then initiate a failover test to ascertain if the first network device 250 is capable of failover communication. In other words, the network controller 212 can initiate a test to determine if the first network device 250 is able to communicate with the network 200 via a different communication port of the same SDN switch 223 or another SDN switch.

In another embodiment, the network controller 212 may apply any of a variety of rules to incoming traffic. For example, the network controller 212 may identify incoming traffic by an IP address and/or a traffic type, then may apply appropriate rules to parse the message or otherwise extract an embedded MAC address 252 from the traffic.

The network controller 212 can send a message to the third SDN switch 223, either immediately, or after a preconfigured delay, to disable the communication port 233. In one embodiment, the network controller 212 may update the central rules table 212t to reflect that the MAC address associated with the MAC 252 is undergoing failover testing. In one embodiment, the network controller 212 will also instruct the third SDN switch 223 to re-enable the communication port 233 after a particular period of time (or failover period). In one embodiment, after the failover period, the network controller 212 may send a second instruction to the third SDN switch 223 to re-enable the communication port 233. The failover period may be long enough in duration to permit the first network device 250 to enter a failover state. In other words, the communication port 233 of the third SDN switch 223 may be disabled for an ample period to allow the first network device 250 to recognize that communication with the network 200 via the communication port 254 and connection 271 has ceased. The first network device 250 may recognize the communication failure by, for example, a cessation of message acknowledgements, if used in the particular network regime, the lack of incoming pings from the network 200 on the communication port 254, a de-energized condition of the physical link itself, etc. Because, for the present example, the first network device 250 has the communication port 256, the first network device 250 may remove the active and inactive designations of the communications ports 254 and 256, and may attempt to communicate with the network 200 via the communication port 256. The attempt by the first network device 250 to communicate with the network 200 may, in one embodiment, comprise simply sending a next payload-bearing message via the communication port 256 and intended for at least the second network device 260.

The communication port 256 may pass the next payload-bearing message, via the connection 272, to a communication port 234 of the fourth SDN switch 224. The fourth SDN switch 224 may conduct the same local rules table query described above, followed by a query to the network controller 212. When the network controller 212 receives the query from the fourth SDN switch 224 bearing the same MAC address previously associated with communication via the communication port 233 of the third SDN switch 223, the network controller 212 can update the central rules table 212t to reflect that (a) communication from the MAC address associated with the MAC 252 of the first network device 250 is currently being received at the communication port 234 of the fourth SDN switch 224, and (b) the network device (the first network device 250) associated with the MAC address of the MAC 252 is capable of failover communication. Notably, because the MAC address of the MAC 252 is expected on the network 200, the central rules table 212t may already comprise one or more rules regarding how to handle the messages received from the first network device 250. The network controller 212 can forward to the fourth SDN switch 224 the one or more rules regarding handling of the messages received from the first network device 250 at the communication port 234. The fourth SDN switch 224 can update its local rules table 224t with the one or more message handling rules received from the network controller 212, and can also execute the one or more rules on the current and subsequent message from the first network device 250. The network controller 212 may also send to the third SDN switch 223 the rules for messages bearing the MAC address of the MAC 252 received at port 233 of the third SDN switch 223. The third SDN switch 223 may insert the one or more rules into the local rules table 223t.

If at any time, the first network device 250 detects a failure to communicate with the network 200 via the communication port 256, the first network device 250 can repeat its failover protocol. If the first network device 250 then communicates with the network 200 via the communication port 254, the communication port 233 of the third SDN switch 223 may receive a message having a header comprising the MAC address of the MAC 252. If the network controller 212 has already transmitted to the third SDN switch 223 the one or more rules for messages from the first network device 250 received on the communication port 233, the third SDN switch 223 will find the one or more rules in the local rules table 223t and may then execute the one or more rules. If the network controller 212 has not sent the one or more rules to the third SDN switch 223, the third SDN switch 223 will not find in the local rules table 223t the one or more rules for messages from the first network device 250. The third network switch 223 may query the network controller 212. The network controller 212 may query the central rules table 212t and find that the message with the MAC address of the MAC 252 has previously been associated with the communication port 233 of the third SDN switch 223, and, further, that the device associated with the MAC address of the MAC 252 is failover capable. The network controller 212 may then transmit to the third SDN switch 223 the one or more rules for handling messages received at the communication port 233 from the network device (the first network device 250) having the MAC address of the MAC 252.

In a similar example, the first network device 250 may have only one communication port 254. When the first message is sent to the network 200, and, subsequently, the communication port 233 of the third SDN switch 223 is disabled, no messages will arrive at the network 200. When the failover period ends and the communication port 233 of the third SDN switch 223 receives a subsequent message from the first network device 250, the third SDN switch 223 may again query the network controller 212. The network controller 212 may query the central rules table 212t and find that the network device (the first network device 250) is undergoing failover testing and was last seen communicating with the network 200 via the communication port 233 of the third SDN switch 223, hence, the first network device 250 does not appear to have a capability to failover to another communication port. The network controller 212 may update the central rules table 212t to reflect (a) communication from the network device (the first network device 250) bearing the MAC address of the MAC 252 is being received at communication port 233 of the third SDN switch 223, and (b) the network device (the first network device 250) is not capable of failover communication.

The central rules table 212t and the local rules table(s) 223t (224t) may also be updated or otherwise contain rules to generate a message for delivery to another network device, such as a human-machine interface (e.g., a display, a portable monitor, a tablet device, etc.) if the first network device 250 subsequently enters a failover communication mode or stops communicating with the network 200.

A network wherein the network controller does not test for a failover capability of a network device is less agile (less capable of responding to changes in the network), less capable of alerting users of an outage of a network device, and more susceptible to network congestion. For example, if the network controller 212 does not test for a failover capability of the first network device 250, when the first network device 250 enters a failover mode due to loss of communication via the communication port 254, the first network device 250 attempts to transmit messages to the network 200 via the communication port 256. In order for the local rules table 224t of the fourth SDN switch 224 to contain rules for handling messages from the first network device 250, the rules must be propagated from the central rules table 212t either globally to all SDN switches of the network 200, or particularly added to each SDN switch which may receive communication from the first network device 250. The former option, to a degree, obviates much of the functionality of the central rules table 212t while bloating all local rules tables, while the latter requires substantial manual intervention in propagating rules to select local rules tables. Both the former and latter methods also necessitate moving away from configuring all SDN switches to employ a default denial scheme as a means to reduce risk of intrusion by unauthorized systems or users.

Figure 3:
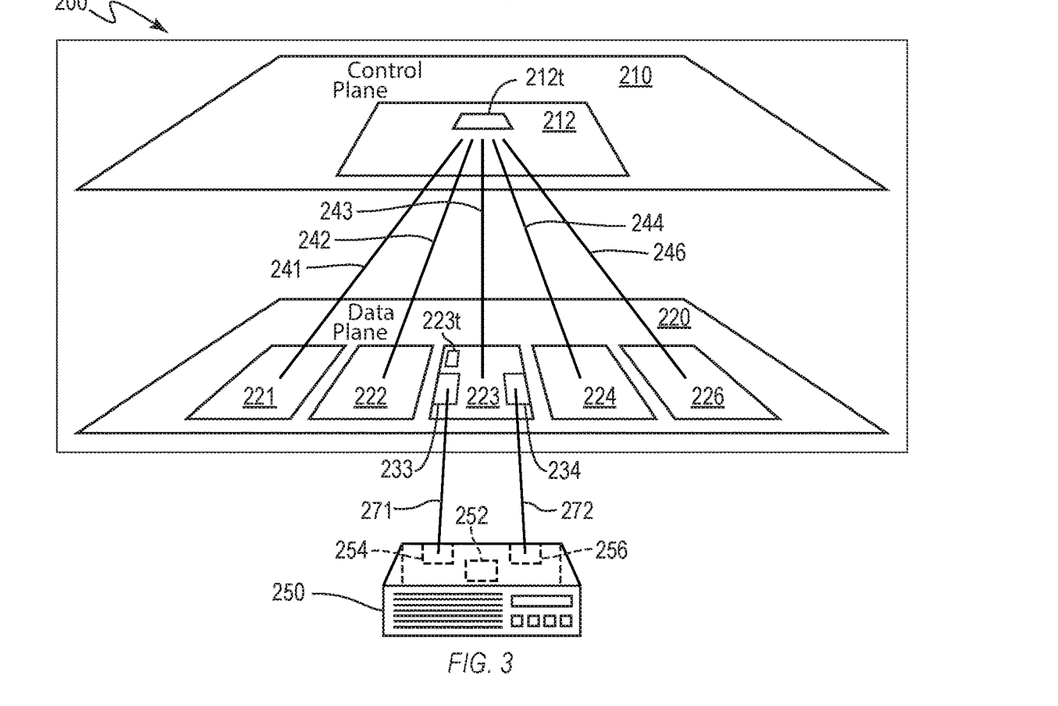
FIG. 3 is a line drawing of the portion of the SDN communication network, according to another embodiment.

FIG. 3 is a line drawing of a portion of the SDN communication network 200, according to another embodiment. The control plane 210, comprising the network controller 212 and the central rules table 212t, is shown for reference, as is the data plane 220. The data plane 220 may comprise any number of SDN switches, of which the first, second, third, fourth, and last SDN switches 221, 222, 223, 224, 226 are shown. Connections 241, 242, 243, 244, 246 between, respectively, the first, second, third, fourth, and last SDN switches 221, 222, 223, 224, 226 are also shown. The first network device 250 comprises the MAC 252 and the two communication ports 254, 256. The first network device 250 is connected to the network 200 via the communication port 254 and connection 271, and via the communication port 256 and connection 272.

In the embodiment of FIG. 3, both connections 271, 272 connect the first network device 250 to the network 200 at a single SDN switch, which, for this example, is the third SDN switch 223. The third SDN switch 223 comprises a plurality of communication ports, of which the first communication port 233 and the second communication port 234 are members. The third SDN switch 223 also comprises a local rules table 223t.

In the embodiment of FIG. 3, when the first network device 250 first communicates with the network 200, the communication, for example, may employ the communication port 254, connection 271, and the first communication port 233. The third SDN switch 223, upon receiving a first communication from the first network device 250 at the communication port 233, may query the local rules table 223t. Because, for the present example, this is a first communication from the first network device 250 received at the communication port 244, the local rules table 223t will not have an entry associated to the inbound message. The third SDN switch 223 may communicate to the network controller 212 the header, comprising the MAC address of the MAC 252 of the first network device 250, and the identifier of the communication port 254. The network controller 212 may query the central rules table 212t. In the present example, the central rules table 212t will indicate that the particular message header represents a first communication from the first network device 250 with the network 200. The network controller 212 may initiate a failover test as described above with reference to FIG. 2.

In the particular configuration shown in FIG. 3, with the first network device 250 first communicating with the network 200 via communication port 254, the network controller 212 may instruct the third SDN switch 223 to disable the communication port 233. The first network device 250, as described in FIG. 2, may detect a failure to communicate with the network 200 via the communication port 254 connected by connection 271 to the communication port 233. The first network device 250 may failover, as described above with reference to FIG. 2, and begin communicating with the network 200 via the communication port 256, connection 272, and communication port 234. When the third SDN switch 223 receives a message on communication port 256 and parses the message to find the header comprising the MAC address of the MAC 252 belonging to the first network device 250, the third SDN switch 223 may again query the local rules table 223t, again find no rule associated to the message, and again query the network controller 212.

The network controller 212, as a result of receiving the previous query from the third SDN switch 223, may have updated or created a rule at the central rules table 212t indicating a first message was received from the network device (the first network device 250) having a MAC with the particular MAC address found in the header of the message, that the message was received at communication port 233, and that a failover test was initiated. As a result of receiving the subsequent query from the third SDN switch 223, the network controller 212 may update the rule at the central rules table 212t to indicate the network device (the first network device) associated with the MAC address of the MAC 252 is now communicating with the network 200 via the communication port 234, and that the particular network device (the first network device 250) is failover capable. The communication port 254 may be re-enabled as described at FIG. 2.

Similarly, if the first network device 250 only had the communication port 254, when the communication port 233 of the third SDN switch 223 was disabled, the first network device 250 may queue subsequent messages and attempt to re-establish communication with the network 200 via the communication port 254. When the communication port 233 of the third SDN switch is re-enabled, the first network device 250 may begin sending the queued messages to the network 200. The third SDN switch 223, upon receiving the first subsequent message at the communication port 233, may again query the local rules table 223t (with no result), and then the network controller 212. The network controller 212 may query the central rules table 212t to find that a failover test is in progress for messages having message headers comprising the MAC address of the MAC 252 of the first network device, and that the failover test was initiated upon receipt of the particular first message at the communication port 233 of the third SDN switch 223. The network controller 212 may update the central rules table 212t to indicate that the network device (the first network device 250) associated with the MAC address of the MAC 252 is not failover capable and communicates with the network 200 only via the communication port 233 of the third SDN switch 223. The network controller 212 may transmit to the third SDN switch 223 the one or more rules regarding handling of messages from the first network device 250. The third SDN switch 223 may update the local rules table 223t with the one or more rules received from the network controller 212 and may proceed to execute the rules upon each message received from the first network device 250 (based upon each message comprising a header with the MAC address of the MAC 252) received at the communication port 233.

In one embodiment, a failover test may implement a broadcast method to identify another communication port (e.g., the communication port 234) of the network 200 through which the first network device 250 may be able to communicate with the network 200. For example, when the first traffic is received from the first network device 250 at the port 233 of the third SDN switch 223, and the network controller 212 is interrogated for (a) traffic handling rule(s), the network controller 212 may initiate a failover test by directing the SDN switch 223 to disable the port 233, and, further, may broadcast a request (such as, e.g., an address resolution protocol (ARP) request, a reverse address resolution protocol (RARP) request, etc.) to all inactive ports of all SDN switches on the network 200. If the first network device 250 is capable of communicating on another communication port (e.g., the communication port 234) of the network 200, the first network device 250 may "hear" the broadcast request on the second communication port 256 of the first network device 250. The first network device 250 may toggle the first communication port 254 to inactive and the second communication port 256 to active, and thereafter send traffic to the network 200 via the second communication port 256, the connection 272, and the communication port 234.

In one embodiment wherein the network controller 212 implements a broadcast protocol (e.g., an ARP request) as part of the failover test, the network controller 212 may cause the broadcast to be transmitted outbound on every outbound-capable communication port of the network 200. In one embodiment wherein the network controller 212 implements a broadcast protocol as part of the failover tests, the network controller 212 may cause the broadcast to be disseminated across a plurality of subsets of the communication ports of the network 200, and, more particularly, may send the broadcast to one subset of the plurality of subsets of communication ports of the network 200 until either a response is received from the first network device 250, or all subsets of the communication ports have been queried. Furthermore, subsets of communication ports of the network 200 may be identified by purpose, geolocation, protocol, or other appropriate means, and a broadcast protocol of a failover test may be limited to any subset(s) having appropriate characteristics relatable to the first network device 250.

Figure 4:
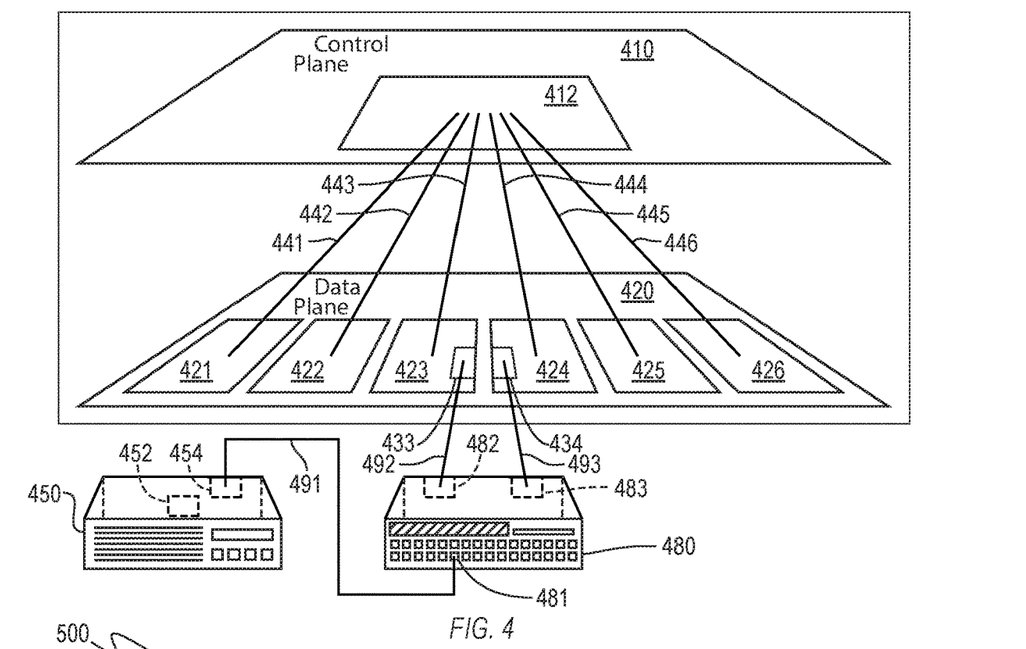
FIG. 4 is a line drawing of a portion of an SDN communication network, according to an embodiment, and having a traditional network switch.

FIG. 4 depicts another embodiment of an SDN communication network that resembles the SDN communication network 200 of FIGS. 2 and 3 described above in certain respects. Accordingly, like features are designated with like reference numerals, with the leading digits incremented to "4." For example, the embodiment depicted in FIG. 4 includes a control plane 410 that may, in some respects, resemble the control plane 210 of FIGS. 2 and 3. Relevant disclosure set forth above regarding similarly identified features thus may not be repeated hereafter. Moreover, specific features of the SDN communication network 200 and related components shown in FIGS. 2 and 3 may not be shown or identified by a reference numeral in the drawings or specifically discussed in the written description that follows. However, such features may clearly be the same, or substantially the same, as features depicted in other embodiments and/or described with respect to such embodiments. Accordingly, the relevant descriptions of such features apply equally to the features of the SDN communication network 400 and related components depicted in FIG. 4. Any suitable combination of the features, and variations of the same, described with respect to the SDN communication network 200 and related components illustrated in FIGS. 2 and 3 can be employed with the SDN communication network 400 and related components of FIG. 4, and vice versa. This pattern of disclosure applies equally to further embodiments depicted in subsequent figures and described hereafter, wherein the leading digits may be further incremented.

FIG. 4 is a line drawing of a portion of an SDN communication network 400, according to an embodiment having a traditional network switch 480. The control plane 410 and network controller 412 are shown for reference, as are the data plane 420, the first, second, third, fourth, fifth, and last SDN switches 421-426 of the plurality of SDN switches of the data plane 420, and the connections 441-446 between the respective SDN switches 421-426 and the network controller 412. The first network device 450 shown. In the embodiment of FIG. 4, the first network device 450 comprises the MAC 452 and the communication port 454.

The first network device 450 connects via the communication port 454 and a connection 491 to a communication port 481 of a traditional network switch 480. The traditional network switch 480 further comprises a communication port 482 and a communication port 483. The communication port 482 connects through connection 492 to the communication port 433 of the third SDN switch 423. The communication port 483 connects through connection 493 to the communication port 434 of the fourth SDN switch 424. The traditional network switch 480 is, essentially, transparent to both the first network device 450 and the network 400. In other words, messages from the first network device 450, generally, are passed through the communication port 454 through the connection 491, through the communication port 481 and the traditional switch 480, and through one of the communication port 482, 483 and respective connection 492 or 493 to the network 400. Each message comprises a header and a payload, wherein the header comprises the MAC address of the MAC 252.

When the first network device 450 sends a first message to the network 400, the message is passed to the traditional network switch 480. The traditional network switch 480, by an appropriate protocol or method, sends the message to the network 400. For example, the traditional network switch 480 may successfully send the message via the communication port 482 and connection 492 to the communication port 433 of the third SDN switch 423. The third SDN switch 423 may then query the local rules table (see the local rules table 223*t* in FIGS. 2, 3), and the network controller 412 as described at FIGS. 2 and 3. The network controller 412 may query the central rules table (see the central rules table 212*t* in FIGS. 2, 3), and initiate a failover test as described at FIGS. 2 and 3. The failover test may result in the traditional switch 480 communicating with the network 400 via the communication port 483, the connection 493, and the communication port 434 of the fourth SDN switch 424.

The network topology and/or architecture between the first network device 450 and the SDN network 400 may be such that both the first network device 450 and the SDN network 400 are unaware that the traditional network switch 480 has failed over. In other words, communication between the first network device 450 and the network 400 may be wholly agnostic with regard to interposition of the traditional network switch 480. The first network device 450 may be unaware that the communication with the network 400 has failed over at the traditional network switch 480; and the SDN network 400 may be unaware that the communication failover occurred at the traditional network switch 480 rather than at the first network device 450. As a result, the network controller 412 may update the central rules table, and cause the local rules tables (see local rules tables 223*t*, 224*t* in FIG. 2) of the third and fourth SDN switches 423 and 424, respectively) to be updated to reflect that first network device 450 is (a) failover capable and (b) currently communicating with the network 400 via the communication port 434 of the fourth SDN switch 424.

Figure 5:
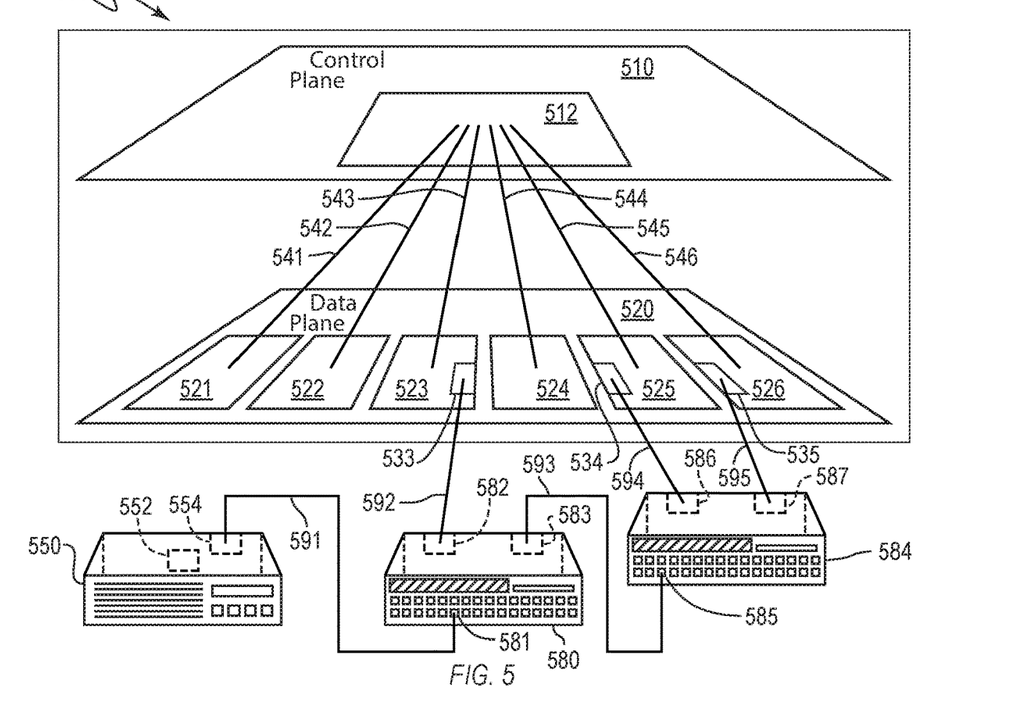
FIG. 5 is a line drawing of a portion of an SDN communication network, according to an embodiment, and having a plurality of traditional network switches.

FIG. 5 is a line drawing of a portion of an SDN communication network (hereafter, network) 500, according to an embodiment having a plurality of traditional network switches 580, 584. The control plane 510, the network controller 512, the data lane 520, the first through fifth and last SDN switches 521-526, and the respective connections 541-546 between the SDN switches 521-526 are shown for reference. The first network device 550 is also shown, along with the MAC 552, the communication port 554, and the connection 591 to the communication port 581 of the first traditional switch 580. The first traditional switch 580 comprises the communication ports 581, 582, and 583. The communication port 582 connects through the connection 592 to the communication port 533 of the third SDN switch 523. The communication port 583 of the first traditional network switch 580 connects through a connection 593 to a communication port 585 of the second traditional network switch 584. The second traditional network switch 584 comprises the communication port 585, and communication ports 586 and 587.

When the first network device 550 sends a first message to the network 500, the message may be communicated via the communication port 554, the connection 591, the communication port 581 of the first traditional network switch 580, the communication port 582 of the first traditional network switch 580, and the communication port 533 of the third SDN switch 523 of the SDN network 500. The third SDN switch 523 may query its local rules table (see the local rules table 223*t* in FIG. 2), and then the network controller 512, as described above. The network controller 512 may query the central rules table (see the central rules table 212*t* in FIG. 2) and determine that the current message represents the first message received by the network 500 having a header comprising a MAC address for the MAC 552 of the first network device 550, and may initiate a failover test.

In the present embodiment, the failover test may be nested such that the failover test repeats cyclically to identify multiple failover capability with regard to the first network device 550. A first iteration of the failover test may disable the communication port 533. The first traditional network switch 580 may recognize the communication failure and attempt to communicate a second message to the network 500 via the communication port 583 and the connection 593. The second message is then received at the communication port 585 of the second traditional network switch 584. The second traditional network switch 584, for the present example, may succeed in delivering the second message via the communication port 586 and the connection 594 to a communication port 534 of the fifth SDN switch 525.

The fifth SDN switch 525 may perform in a manner essentially similar to the third SDN switch 523 when the first message was received at the communication port 533 of the third SDN switch 523. The fifth SDN switch 525 may query the local rules table (see the local rules table 525*t* in FIG. 2), and then the network controller 512. The network controller 512 may query the central rules table 212*t* and determine that a failover test is in process for messages having a header comprising the MAC address for the MAC 552 of the first network device 550. In the present embodiment, the failover test may be nested, or may be otherwise configured to self-repeat. In other words, in conjunction with receipt of the first message from the first network device 550 at the communication port 533, the network controller 512 instructed third SDN switch 523 to disable the communication port 533. With the communication port 533 remaining disabled, the network controller 512, in conjunction with receipt of the second message via the communication port 534, may instruct the fifth SDN switch 525 to disable the communication port 534.

With the communication port 534 of the fifth SDN switch 525 disabled, the second traditional network switch 584 may recognize the communication failure and may failover to communicate a third message to the network 500 via the communication port 587 and the connection 595. The third message may thus reach the network 500 at the communication port 535 of the last SDN switch 526. The last SDN switch 526 may query its local rules table (see the local rules table 226*t* in FIG. 2), and then the network controller 512. The network controller 512 may query the central rules table 212*t* and determine that a failover test is in process and in the second evolution with regard to messages bearing a header comprising the MAC address of the MAC 552 of the first network device 550.

In the present embodiment, the network controller 512 may (a) update the central rules table 212*t* to reflect that, essentially, the first network device 550 is capable of redundant failover involving the communication ports 533, 534, and 535; (b) update the local rules table 223*t* with the one or more rules for handling messages from the first network device 550 at the communication port 533 of the third SDN switch 523; (c) update the local rules table 225*t* similarly for messages received at the communication port 534 of the fifth SDN switch 525; and (d) similarly update the local rules table 226*t* for messages received at the communication port 535 of the last SDN switch 526.

In another, similar embodiment, the failover testing may be further iterative to test for additional failover routes related to the first network device 550. In one embodiment, the iterative testing for failover may be limited to a configured maximum number of identified failover routes, even if more routes may exist. In one embodiment, the iterative testing for failover may be limited to running for a configured time, regardless of the number of failover routes identified.

In conjunction with each identified failover route, the central rules table 212*t* may be updated to reflect that the first network device 550 is capable of failover, and of sending messages to the network 500 to arrive at a particularly identified port of a particularly identified SDN switch. The local rules table (see the local rules tables 221*t*-226*t* in FIG. 2) at each SDN switch having a communication port that received at least one message from the first network device 550 may be updated with the one or more rules for handling messages from the first network device 550 received at the particularly identified port of the individual SDN switch.

Figure 6:
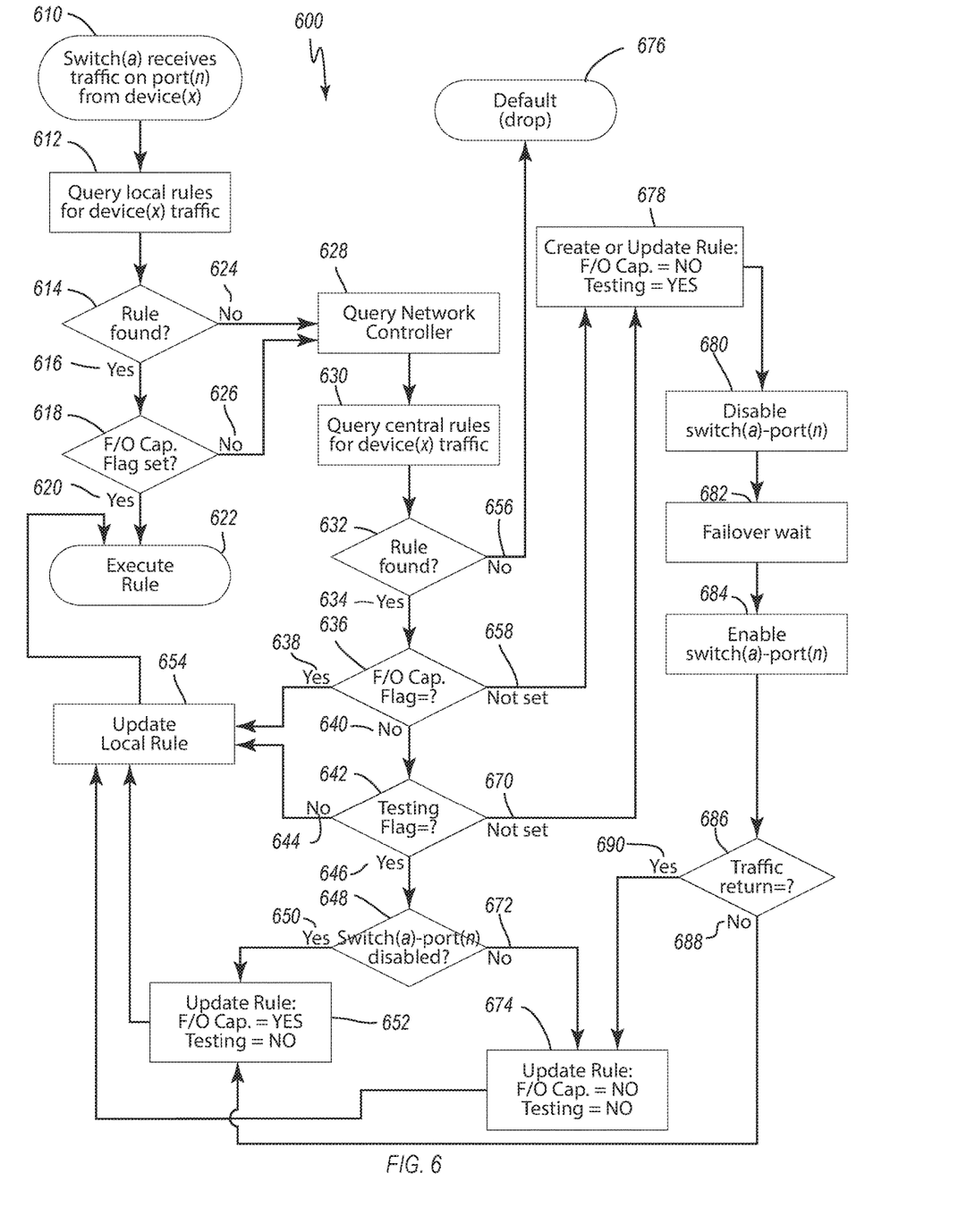
FIG. 6 is a logic diagram for an SDN network controller, according to an embodiment of the present disclosure.

FIG. 6 is a logic diagram for an SDN network, such as the SDN networks 200, 400, 500 described herein. More particularly, the logic diagram 600 illustrates a method of identifying a failover capability, or lack thereof, in a network device attached to the SDN network (see the first network device 250, 450, 550, and the SDN network 200, 400, 500 in FIGS. 2-5). For convenience of the disclosure, reference to components of previous figures shall follow a pattern of [nomenclature] x[99] where [nomenclature] represents the nominal reference to the component, and x[99] represents a modified numerical reference of "x" followed by two digits of the nominal components. For example, the "network 200, 400, 500" is referred to as the "network x00." This pattern is intended to capture the previously described embodiments as well as additional embodiments envisioned by the disclosure.

An SDN switch x23 receives 610 traffic on a port x33 from a network device x50. The SDN switch x23 queries 612, 614 the local rules table x23*t* for one or more rules regarding handling of the traffic from the network device x50. If at least one rule is found 616, the SDN switch x23, in one embodiment, may determine whether a failover capability flag is set 618. If the failover capability flag is set 620, the SDN switch x23 executes 622 the one or more rules. If the failover capability flag is not set 626, or if no rule is found 624 in the local rules table x23*t*, the SDN switch x23 queries 628 the network controller x10.

The network controller x12, in turn, queries 630 the central rules table x12*t* to see if a rule exists 632 for the network device x50. If no rule is found 656 in the central rules table x12*t*, the network device x50 is viewed, by default, as an intruder on the SDN network x00, the default handling rule (drop) 676 will be applied to traffic from the network device x50, and no testing for failover capability will ensue. In one embodiment, the network controller x12 may not respond to the query 628 from the SDN switch x23 and the SDN switch x23 will implement the default rule 676 after a pre-configured wait period. In another embodiment, the network controller x12 may send a "drop" command to the SDN switch x23.

A rule (a failover rule or a traffic handling rule) created at the central rules table x12*t* for a network device x50 may comprise data elements in a plurality of data tables. If a traffic handling rule exists in the central rules table x12*t* but no failover rule exists, a failover rule is created 678. In one embodiment, an empty failover rule may exist wherein the failover capability flag 636 is NOT SET 658. The failover rule 678 substantially comprises setting a failover capability flag to NO and a testing flag to YES. The new rule is populated to the central rules table x12*t*, and the network controller x10 may send a message to the particular SDN switch x23 to disable 680 the port x33 where the traffic from the network device x50 was received. A failover wait state 682 commences, at the end of which the port x33 on the SDN switch x23 is re-enabled 684. The failover wait state endures a sufficient period of time, in computing terms, to allow the network device x50 to perform any failover protocol the network device x50 may comprise.

If the network device x50 is capable of communicating with the network x00 by any other port at the network side of communication, the network device x50 is failover capable. This includes the embodiment of FIGS. 2 and 3 (the network device 250 has multiple ports connected to the network 200), and the embodiments of FIGS. 4 and 5 (the network device 450, 550 communicates to the network 400, 500 via one or more traditional switches 480, 580, 584), as well as other embodiments.

If the network device x50 has this failover capability, traffic from the network device x50 may arrive at a different port of the same SDN switch (e.g., the port 234 of the SDN switch 223 of FIG. 3), or at a port of another SDN switch (e.g., the port 234 of the SDN switch 224 of FIG. 2), etc. By design, the traffic will arrive 610 at the port x34 during the failover wait state 682. The SDN switch x2*x* (meaning any switch x21-x26 of FIGS. 2-5) will query 612, 614 the local rules table. In the present example, no rules 624 will be found in the local rules table, so the SDN switch x2*x* will query 628 the network controller x10. The network controller x10 will query 630 the central rules table x12*t*, for the failover rule 632 and will find 634 a failover rule. The rule in the central rules table x12*t* will have the failover capability flag 636 set to NO 640 and the testing flag 642 set to YES 646. The network controller x12 will determine 648 if the port x33 of the prior traffic is disabled. With the port x23 still disabled (YES) 650, the network controller x10 will update the rule at the central rules table x12*t* by setting the failover capability flag to YES and the testing flag to NO 652. The network controller x10 will then publish the failover rule, along with any traffic handling rules related to the network device x50, to the SDN switch x2*x* currently holding traffic (the latest traffic) from the network device x50. The failover rules and traffic handling rules will be inserted or updated 654 in the local rules table and the SDN switch x2*x* will execute 622 the traffic handling rules.

In another example, if, on the second traffic iteration, the central rules table indicates the failover capability flag 636 is set to NO 640 and the testing flag 642 is set to YES 646, but the port x33 648 is no longer disabled 672, the failover rule is updated 674 with the failover capability flag set to NO and the testing flag set to NO. In this example, the network device x50 is not capable of failover communication with the network x00. The traffic handling rule(s) for the network device x50 is (are) published 654 to the local rules table x23*t* and the SDN switch s23 executes 622 the traffic handling rule(s).

In another example, the failover rule may be configured to have the failover capability flag 636 set to NO 640 and have the testing flag 642 NOT SET 670 (for example, to force the network controller x12 to retest a particular network device x50, a particular selection of network devices, or all network devices). In this example, the failover rule of the central rules table x12*t* will be updated 678 with the failover capability flag set to NO and the testing flag set to YES, and testing will proceed as described above.

In another example, on the second iteration of traffic, with the failover capability flag 636 set to NO 640, the testing flag 642 may be set to NO 644. The local rules table x23*t* is updated 654 with at least the traffic handling rule(s) and the SDN switch x23 executes 622 the traffic handling rule(s).

In another example, on a subsequent arrival of traffic, the central rules table may contain a failover rule 630, 632, 634 having the failover capability flag 636 set to YES 638. The local rules table may be updated 654 with at least the traffic handling rule(s), and the pertinent SDN switch x2*x* may then execute 622 the traffic handling rules.

In another example, testing for a failover capability of the network device x50 may be completed and the pertinent SDN switch x21-x26 may have completed port disabling and enabling 680, 682, 684, and a traffic return wait state 686 is achieved. The traffic return wait state 686 may be, e.g., a condition in which the particular port of the pertinent SDN switch x21-x26 is in a passive-on state during which the port is not polling for traffic, but the port is able to receive traffic that may be sent to the port. During the traffic return wait state 686, if traffic from the particular network device x50 does not arrive 688, the central rules table may be updated 652 (or may already been updated) to reflect the network device x50 is failover capable and not testing. Conversely, if traffic from the network device x50 does appear 690 at the port, the central rules table may be updated 674 to indicate the network device x50 is not failover capable and is not testing. In one embodiment wherein testing of the network device x50 has already resulted in a rule 652 indicating the network device x50 is failover capable and not testing, a reappearance of traffic from the network device x50 during the traffic return wait state 686, 690 may indicate the network device x50, while having a failover capability, has a preference for communicating via the particular port of the particular SDN switch x21-x26. The central rules table may retain an entry reflecting the network device x50 is failover capable and not testing. In one embodiment, the central rules table may be configured to reflect a port preference for the network device x50, in addition to the failover capability.

Provided at least one traffic handling rule is found 632, 634 in the central rules table x12*t*, the network controller x12 may be able to test a network device x50 for failover capability regardless of which SDN controller received the traffic, or on which port of the SDN controller. This may provide the SDN network x00 with substantial robustness and agility in view of network devices x50 which may be routed through a number of network-external devices (including a direct connection with no intermediating external devices) before connecting to the SDN network x00.

For convenience of the present disclosure, only a select number of network devices (first and second), communication ports, SDN switches (first through fifth, and last), traditional switches (first and second), and connections have been identified. The disclosure anticipates that there may be any number each of these in a particular application. The disclosure is not intended to limit the invention to the quantity of devices, communication ports, connections, switches, etc. in the examples presented herein. Furthermore, the accompanying logic diagram is intended as a principled example and not a limitation, in particular, with regard to iterative processing, as will be apparent to one of ordinary skill in the art.

EXAMPLE EMBODIMENTS

The following are some example embodiments within the scope of the disclosure. In order to avoid complexity in providing the disclosure, not all of the examples listed below are separately and explicitly disclosed as having been contemplated herein as combinable with all of the others of the examples listed below and other embodiments disclosed hereinabove. Unless one of ordinary skill in the art would understand that these examples listed below (and the above disclosed embodiments) are not combinable, it is contemplated within the scope of the disclosure that such examples and embodiments are combinable.

Example 1. A system for detection of a failover capability of a network device, the system comprising a network controller in communication with one or more switches in a network, at least one switch of the one or more switches in communication with the network device, the network controller to detect network traffic from the network device through a first port of a first switch of the one or more switches; disable the first port; monitor for additional network traffic from the network device through a different port on the network; if the additional network traffic from the network device is not detected at the different port after a timeout period long enough for the network device to failover, re-enable the first port, monitor for the additional network traffic from the network device through the first port, if the additional network traffic from the network device is detected on the first port, note the network device as not having failover capability; and if the additional network traffic from the network device is not detected on the first port, note the network device as having failover capability.

Example 2. The system of example 1, wherein the different port is on a different switch on the network.

Example 3. The system of example 2, wherein the different port of the different switch is communicatively coupled to a port of a plurality of ports on the network device.

Example 4. The system of example 1, wherein, if the network traffic is not detected at the different port after the timeout period, the network controller ceases monitoring for the additional network traffic before re-enabling the first port.

Example 5. The system of example 1, wherein the network is a software defined network (SDN), the first switch is an SDN switch, and the network controller is an SDN controller.

Example 6. The system of example 1, wherein the first port of the first switch is communicatively coupled to a first port of a plurality of ports on the network device.

Example 7. The system of example 1, wherein, if the additional network traffic from the network device is not detected on the first port after re-enabling the first port, the network controller detects a new port of a new switch on the network in communication with a failover port of the network device.

Example 8. The system of example 1, wherein, if the additional network traffic is detected at the different port on the network, the network controller notes the network device as having failover capability.

Example 9. The system of example 8, wherein if the additional network traffic is detected at the different port on the network, the network controller re-enables the first port.

Example 10. The system of example 9, wherein if the additional network traffic is detected at the different port on the network, the network controller further monitors for the additional network traffic from the network device through the first port, and notes the network device as having failover capability, if the additional network traffic from the network device is again detected on the first port, and the network controller may further note the network device as having a preference capability in addition to a failover capability.

Example 11. A method for detecting a failover capability of a network device, the method comprising detecting network traffic from a network device through a first port of a first switch of a network (including an SDN network), the first switch in electronic communication with the network device and with the network controller; disabling the first port; monitoring for additional network traffic from the network device through a different port on the network; if the additional network traffic from the network device is not detected at the different port after a timeout period long enough for the network device to failover, re-enabling the first port; monitoring for the additional network traffic from the network device through the first port; if the additional network traffic from the network device is detected on the first port, marking the network device as not having failover capability; and if the additional network traffic from the network device is not detected on the first port, marking the network as having failover capability, and further marking the network device as having failover capability if the additional traffic is noted on a different port, then returns to the first port once the first port is re-enabled.

Example 12. The method of example 11, wherein the different port is on a different switch on the network.

Example 13. The method of example 12, wherein the different port of the different switch is communicatively coupled to a port of a plurality of ports on the network device.

Example 14. The method of example 11, further comprising, if the additional network traffic is not detected at the different port after the timeout period, ceasing monitoring of the additional network traffic before re-enabling the first port.

Example 15. The method of example 11, wherein the network is a software defined network (SDN), the first switch is an SDN switch and the network controller is an SDN controller.

Example 16. The method of example 11, wherein the first port of the first switch is communicatively coupled to a first port of a plurality of ports on the network device.

Example 17. The method of example 11, further comprising, if the additional network traffic from the network device is not detected on the first port after re-enabling the first port, detecting a new port of a new switch on the network in communication with a failover port of the network device.

Example 18. The method of example 11, further comprising, if the additional network traffic is detected at the different port on the network, marking the network device as having failover capability.

Example 19. The method of example 18, further comprising, if the additional network traffic is detected at the different port on the network, re-enabling the first port.

Example 20. The method of example 19, further comprising, if the additional network traffic is detected at the different port on the network, monitoring for the additional network traffic from the network device through the first port; marking the network device as having failover capability with a preference for the first port, if the additional network traffic from the network device is again detected on the first port; and marking the network device as having failover capability if the additional network traffic from the network device is not detected on the first port.

Example 21. A method of a network controller for detecting a failover capability of a network device, the method comprising: detecting network traffic from a network device through a first port of a first switch of a network (including an SDN network), the first switch in electronic communication with the network device and with a network controller; disabling the first port; monitoring for additional network traffic from the network device through a different port, including a port of a different switch, on the network; if the additional network traffic from the network device is detected through the different port, including a port of a different switch, on the network, marking the network device as having failover capability.

Example 22. The method example 21, further comprising, if the additional network traffic from the network device is detected through a different port, including a port of a second switch, on the network, re-enabling the first port.

Example 23. The method of example 22, further comprising, after re-enabling the first port: monitoring for the additional network traffic from the network device through the first port; and marking the network device as having failover capability with a preference for the first port, if the additional network traffic from the network device is detected on the re-enabled first port.

Example 24. The method of example 23, further comprising, marking the network device as having failover capability, if the additional network traffic from the network device is not detected on the re-enabled first port.

Example 25. A method of a network controller for detecting a failover capability of a network device, the method comprising: detecting network traffic from a network device through a first port of a first switch of a network, including an SDN network, the first switch in electronic communication with the network device and with a network controller; disabling the first port; monitoring for additional network traffic from the network device through a different port of a different switch of the network; if the additional network traffic from the network device is detected through the different port of a second switch on the network or if the additional network traffic from the network device is not detected after a timeout period long enough for the network device to failover: ceasing monitoring for the additional network traffic; re-enabling the first port; monitoring for the additional network traffic from the network device through the first port; if the additional network traffic from the network device is detected on the first port, marking the network device as having failover capability; and if the additional network traffic from the network device is not detected on the first port, marking the network device as having failover capability; and, if the additional network traffic from the network device is detected on the second port and returns to the first port when the first port is re-enabled, marking the network device as having failover capability (and potentially marking a preference of the network device for the first port).

Example 26. A method of a network controller for detecting a failover capability of a network device, the method comprising: sending an active request (e.g., via address resolution protocol (ARP)) to a network device through a first port of a first switch of a network (e.g., an SDN network), the first switch in electronic communication with the network device and with a network controller; disabling the first port; sending an active request (e.g., via ARP) to the network device through all other available ports on the network; monitoring for an answer to the active request from the network device through a different port on the network; and if the response from the network device is detected through the different port on the network, marking the network device as having failover capability.

Example 27. The method of example 26, wherein the failover capability is a second port on the network device.

Example 28. The method of example 26, wherein the failover capability is a failover communication route through an unmanaged (outside control of the network controller) networking component.

Example 29. The method of example 26, wherein sending the active request comprises sending an ARP request.

Example 30. The method of example 26, wherein the network is a software defined network (SDN), the first switch is an SDN switch and the network controller is an SDN controller.

Example 31. The method of example 26, wherein the different port is on a different switch on the network.

Example 32. A system for detecting a failover capability of a network device, the system comprising: one or more switches of a network in communication; a network controller to control, and in communication with, the one or more switches of the network, the network controller to: detect network traffic from the network device through a first port of a first switch of the one or more switches; disable the first port; monitor for additional network traffic from the network device through a different port (e.g., of a different switch) on the network; if the additional network traffic (e.g., from the network device) is not detected at the different port during a timeout period long enough for the network device to failover: ceasing monitoring for the additional network traffic; re-enable the first port; monitor for the additional network traffic from the network device through the first port; mark the network device as not having failover capability, if the additional network traffic from the network device is detected on the first port; and mark the network device as having failover capability, if the additional network traffic from the network device is not detected on the first port.

While specific embodiments and applications of the disclosure have been illustrated and described, it is to be understood that the disclosure is not limited to the precise configuration and components disclosed herein. Various modifications, changes, and variations apparent to those of skill in the art may be made in the arrangement, operation, and details of the methods and systems of the disclosure without departing from the spirit and scope of the disclosure.

Any methods disclosed herein include one or more steps or actions for performing the described method. The method steps and/or actions may be interchanged with one another. In other words, unless a specific order of steps or actions is required for proper operation of the embodiment, the order and/or use of specific steps and/or actions may be modified and/or steps or actions may be omitted.

In some cases, well-known features, structures, or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations. Thus, all feasible permutations and combinations of embodiments are contemplated.

Several aspects of the embodiments described may be implemented using hardware, firmware and/or software modules or components. As used herein, a module or component may include various hardware components, firmware code, and/or any type of computer instruction or computer executable code located within a memory device and/or transmitted as transitory or non-transitory electronic signals over a system bus or wired or wireless network.

Several aspects of the embodiments disclosed herein may be illustrated and/or implemented as software modules or components. As used herein, a software module or component may include any type of computer instruction or computer executable code located within a memory device that is operable in conjunction with appropriate hardware to implement the programmed instructions. A software module or component may, for instance, comprise one or more physical or logical blocks of computer instructions, which may be organized as a routine, program, object, component, data structure, etc., that performs one or more tasks or implements particular abstract data types.

In certain embodiments, a particular software module or component may comprise disparate instructions stored in different locations of a memory device, which together implement the described functionality of the module. Indeed, a module or component may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a non-transitory machine-readable medium having stored thereon instructions that may be used to program a computer or other electronic device to perform processes described herein. The non-transitory machine-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of media/machine-readable medium suitable for storing electronic instructions. In some embodiments, the computer or other electronic device may include a processing device such as a microprocessor, microcontroller, logic circuitry, or the like. The processing device may further include one or more special purpose processing devices such as an application specific interface circuit (ASIC), PAL, PLA, PLD, field programmable gate array (FPGA), or any other customizable or programmable device.

In the description above, various features are sometimes grouped together in a single embodiment, figure, or description thereof for the purpose of streamlining the disclosure. This method of disclosure, however, is not to be interpreted as reflecting an intention that any claim requires more features than those expressly recited in that claim. Rather, as the following claims reflect, inventive aspects lie in a combination of fewer than all features of any single foregoing disclosed embodiment. Thus, the claims are hereby expressly incorporated into this Detailed Description, with each claim standing on its own as a separate embodiment. This disclosure includes all permutations and combinations of the independent claims with their dependent claims.

The scope of the present disclosure should, therefore, be determined only by the following claims.

The invention claimed is:

1. A system for detection of a failover capability of a network device, the system comprising:
 a network controller in communication with one or more switches in a network, at least one switch of the one or more switches in communication with the network device, the network controller to:
  detect network traffic from the network device through a first port of a first switch of the one or more switches;
  disable the first port;
  monitor for additional network traffic from the network device through a different port on the network;
  if the additional network traffic is not detected at the different port after a timeout period long enough for the network device to failover:
   re-enable the first port;
   monitor for the additional network traffic from the network device through the first port;
   if the additional network traffic from the network device is detected on the first port, note the device as not having failover capability;
   if the additional network traffic from the network device is not detected on the first port, note the device as having failover capability; and
  if the additional network traffic is detected at the different port on the network, the network controller notes the device as having failover capability.

2. The system of claim 1, wherein the different port is on a different switch on the network.

3. The system of claim 2, wherein the different port of the different switch is communicatively coupled to a port of a plurality of ports on the network device.

4. The system of claim 1, wherein, if the additional network traffic is not detected at the different port after the timeout period, the network controller ceases monitoring for the additional network traffic before re-enabling the first port.

5. The system of claim 1, wherein the network is a software defined network SON, the first switch is an SON switch, and the network controller is an SON controller.

6. The system of claim 1, wherein the first port of the first switch is communicatively coupled to a first port of a plurality of ports on the network device.

7. The system of claim 1, wherein, if the additional network traffic from the network device is not detected on the first port after re-enabling the first port, the network controller detects a new port of a new switch on the network in communication with a failover port of the network device.

8. The system of claim 1, wherein the if the additional network traffic is detected at the different port on the network, the network controller re-enables the first port.

9. The system of claim 8, wherein the if the additional network traffic is detected at the different port on the network, the network controller further:
 monitors for the additional network traffic from the network device through the first port; and
 notes the device as having failover capability with a preference for communicating through the first port, if the additional network traffic from the network device is again detected on the first port.

10. A method for detecting a failover capability of a network device, the method comprising:
 detecting network traffic from a network device through a first port of a first switch of a network, the first switch in electronic communication with the device;
 disabling the first port;
 monitoring for additional network traffic from the network device through a different port on the network;
 if the additional network traffic is not detected at the different port after a timeout period long enough for the network device to failover:
  re-enabling the first port;
  monitoring for the additional network traffic from the network device through the first port;
  if the additional network traffic from the network device is detected on the first port, marking the device as not having failover capability;
  if the additional network traffic from the network device is not detected on the first port, marking the device as having failover capability; and
 if the additional network traffic is detected at the different port on the network, marking the device as having failover capability.

11. The method of claim 10, wherein the different port is on a different switch on the network.

12. The method of claim 11, wherein the different port of the different switch is communicatively coupled to a port of a plurality of ports on the network device.

13. The method of claim 10, further comprising, if the additional network traffic is not detected at the different port after the timeout period, ceasing monitoring for the additional network traffic before re-enabling the first port.

14. The method of claim 10, wherein the network is a software defined network SON, the first switch is an SON switch and the network controller is an SON controller.

15. The method of claim 10, wherein the first port of the first switch is communicatively coupled to a first port of a plurality of ports on the network device.

16. The method of claim 10, further comprising, if the additional network traffic from the network device is not detected on the first port after re-enabling the first port, detecting a new port of a new switch on the network in communication with a failover port of the network device.

17. The method of claim 10, further comprising, if the additional network traffic is detected at the different port on the network, re-enabling the first port.

18. The method of claim 17, further comprising, if the additional network traffic is detected at the different port on the network,
 monitoring for the additional network traffic from the network device through the first port;
 marking the device as having failover capability if the additional network traffic from the network device is not detected on the first port; and
 marking the device as having failover capability with a preference for communicating through the first port, if the additional network traffic from the network device is again detected on the first port.

* * * * *

UNITED STATES PATENT AND TRADEMARK OFFICE
CERTIFICATE OF CORRECTION

PATENT NO. : 11,228,521 B2  
APPLICATION NO. : 16/672630  
DATED : January 18, 2022  
INVENTOR(S) : Mullis Page 1 of 1

It is certified that error appears in the above-identified patent and that said Letters Patent is hereby corrected as shown below:

In the Claims

In Claim 5, Column 23, Line 42, delete "SON" (both instances) and insert --SDN-- therefore.

In Claim 5, Column 23, Line 43, delete "SON" and insert --SDN-- therefore.

In Claim 8, Column 23, Line 52, delete first "the" from the phrase "the if the".

In Claim 9, Column 23, Line 55, delete first "the" from the phrase "the if the".

In Claim 14, Column 24, Line 35, delete "SON" (both instances) and insert --SDN-- therefore.

In Claim 14, Column 24, Line 36, delete "SON" and insert --SDN-- therefore.

Signed and Sealed this  
Fifth Day of April, 2022

Drew Hirshfeld  
*Performing the Functions and Duties of the  
Under Secretary of Commerce for Intellectual Property and  
Director of the United States Patent and Trademark Office*